E. C. KAISER.
DASH POT.
APPLICATION FILED OCT. 3, 1914.

1,280,755.

Patented Oct. 8, 1918.

WITNESSES:
Fred A. Lind.
R. D. Brown

INVENTOR
Edward C. Kaiser
BY
Chulus S. Carr
ATTORNEY

UNITED STATES PATENT OFFICE.

EDWARD C. KAISER, OF HOMEWOOD, PENNSYLVANIA, ASSIGNOR TO WESTINGHOUSE ELECTRIC AND MANUFACTURING COMPANY, A CORPORATION OF PENNSYLVANIA.

DASH-POT.

1,280,755.

Specification of Letters Patent.

Patented Oct. 8, 1918.

Application filed October 3, 1914. Serial No. 864,732.

*To all whom it may concern:*

Be it known that I, EDWARD CHARLES KAISER, a citizen of the United States, and a resident of Homewood, in the county of Allegheny and State of Pennsylvania, have invented a new and useful Improvement in Dash-Pots, of which the following is a specification.

My invention relates to dash pots, and it has special reference to liquid-containing dash pots that are adapted for use in connection with electrical apparatus, such as constant-current regulators.

The object of my invention is to provide a dash pot the speed of operation of which may be varied within wide limits and which shall be simple and inexpensive in construction.

Figure 1:
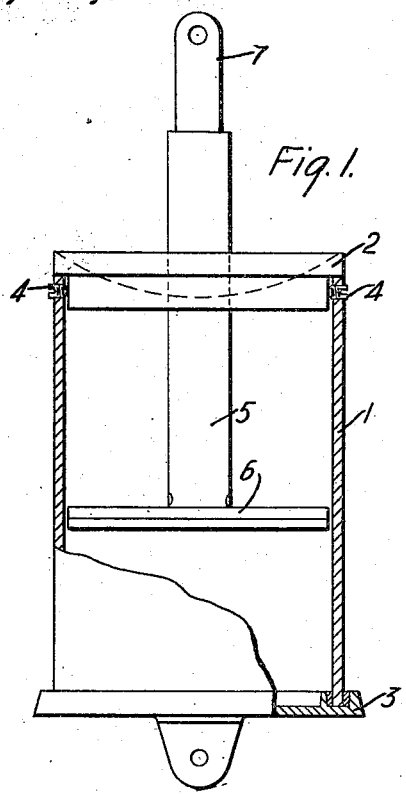
Figure 2:
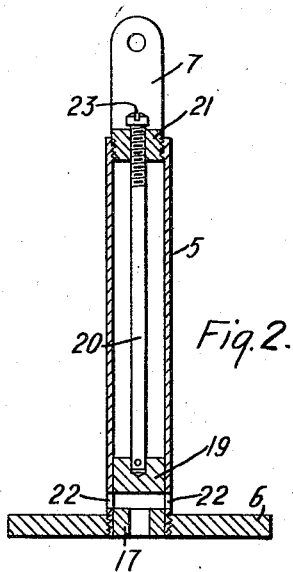

In the accompanying drawing, Figure 1 is a side view, partially in elevation and partially in section, showing a dash pot constructed in accordance with my invention. Fig. 2 is a side sectional view showing the piston structure.

In connection with certain forms of electrical apparatus, particularly in constant-current regulators in which movable coils are employed for voltage-regulating purposes, it is usual to provide dash pots for limiting the speed at which such coils are permitted to move. Such dash pots are commonly of the type in which a piston reciprocates within an inclosed cylinder filled with oil or other suitable liquid, an opening being provided in the piston through which the oil within the cylinder passes as the piston is forced from one end of the cylinder to the other. According to my present invention, I provide a dash pot of the type just described with means for varying the extent of the opening through the piston, and I thereby render it possible to use a single size of dash pot in many different situations where the piston is required to operate at different speeds.

Referring to Fig. 1 of the drawings, a casing 1, which may be of cylindrical or other suitable form, is tightly closed at its upper and lower ends by a cover 2 and a cap 3. The cap 3 may conveniently be soldered to the lower end of the casing 1, and the cover 2 may be removably secured to the upper end of the cylinder by means of screws 4 or in any other suitable manner. Packing may be provided between the cover 2 and the casing 1, in order to insure an oil-tight joint. A piston rod 5 extends through an opening in the cover 2 and is rigidly secured, at its inner end, to a piston 6 that fits slidably within the casing 1. The outer end of the piston rod 5 is provided with a suitable connector 7, by means of which it may be attached to the regulator or other device with which the dash pot is to be used.

The piston rod 5 is hollow, its lower end being closed by a perforated plug 17, and is screwed into the piston 6. Within the lower end of the piston rod 5 is a solid plug 19 that is secured either rigidly or rotatably to the lower end of a rod 20 which extends the full length of the piston rod 5 and is provided with screw threads at its outer end which are engaged by a nut 21 that is exteriorly screw threaded to engage the internally threaded upper end of the piston rod 5. If the plug 19 is rotatably secured to the rod 20, it may be prevented from turning in the tube 5 by means of suitable ribs and slots, and in such case, it will have only a sliding movement in the tubular rod 5. The walls of the tubular piston rod are provided, near the piston 6, with one or more apertures 22, and the upper end of the rod 20 is provided with a slot 23 to enable the rod 20 to be turned by means of a screwdriver or other suitable tool, whereby the plug 19 may be raised and lowered within the tubular piston rod, thus increasing or decreasing the effective size of the apertures 22.

It will be understood that the rapidity with which the piston 6 passes through the casing 1 depends upon the rate of liquid flow through the openings 22 in the piston rod 5, and such rate of flow may be regulated by vertical adjustment of the plug 19 from the position shown in Fig. 2—which permits a maximum liquid flow—to any other desired position in which the openings are partially covered. Furthermore, attention should be paid to the fact that any desired adjustment may be easily and quickly effected from the outside.

Many structural modifications of my device may readily be devised by persons skilled in the art to which my invention appertains, and it is therefore to be understood that my invention is not restricted to the precise embodiments which I have shown and described, but is limited only by the scope of the appended claims.

I claim as my invention:

1. A dash pot comprising a piston having a transverse opening, a hollow piston rod secured at one end within the said opening and provided with an aperture in its wall, a member slidably disposed within the said hollow piston rod and adapted to vary the effective area of the said aperture and a perforated plug disposed within the end of the said piston rod adjacent to the said piston.

2. A dash pot comprising a piston having a transverse opening, a hollow piston rod secured at one end within the said opening and provided with an aperture in its wall, a perforated plug disposed within the end of the said piston rod adjacent to the said piston, a member slidably disposed within the said hollow piston rod and adapted to vary the effective area of the said aperture, and means operable from the exterior of the dash pot for varying the position of the said member.

In testimony whereof, I have hereunto subscribed my name this 23rd day of September, 1914.

EDWARD C. KAISER.

Witnesses:
C. W. DOANE,
B. B. HINES.

Copies of this patent may be obtained for five cents each, by addressing the "Commissioner of Patents, Washington, D. C."